No. 749,625. PATENTED JAN. 12, 1904.
D. McINTYRE.
HYDRAULIC MOTOR.
APPLICATION FILED APR. 4, 1903.
NO MODEL. 2 SHEETS—SHEET 1.

WITNESSES
Lotta Lee Hayton.

INVENTOR
David McIntyre
By Parker & Burton
Attorneys.

No. 749,625. PATENTED JAN. 12, 1904.
D. McINTYRE.
HYDRAULIC MOTOR.
APPLICATION FILED APR. 4, 1903.
NO MODEL. 2 SHEETS—SHEET 2.

WITNESSES
Lotta Lee Hayton
T. G. Massey

INVENTOR
David McIntyre
By Parker & Burton
Attorneys.

No. 749,625. Patented January 12, 1904.

UNITED STATES PATENT OFFICE.

DAVID McINTYRE, OF DETROIT, MICHIGAN, ASSIGNOR TO HIMSELF, JOHN G. HACKING, GEORGE G. EPSTEAN, AND LOUIS C. McBRIDE, OF DETROIT, MICHIGAN.

HYDRAULIC MOTOR.

SPECIFICATION forming part of Letters Patent No. 749,625, dated January 12, 1904.

Application filed April 4, 1903. Serial No. 151,046. (No model.)

*To all whom it may concern:*

Be it known that I, DAVID McINTYRE, a citizen of the United States, residing at Detroit, county of Wayne, State of Michigan, have invented a certain new and useful Improvement in Hydraulic Motors; and I declare the following to be a full, clear, and exact description of the invention, such as will enable others skilled in the art to which it pertains to make and use the same, reference being had to the accompanying drawings, which form a part of this specification.

This invention relates to hydraulic motors, and has for its object an improved motor adapted to be actuated by moving water.

Figure 1:
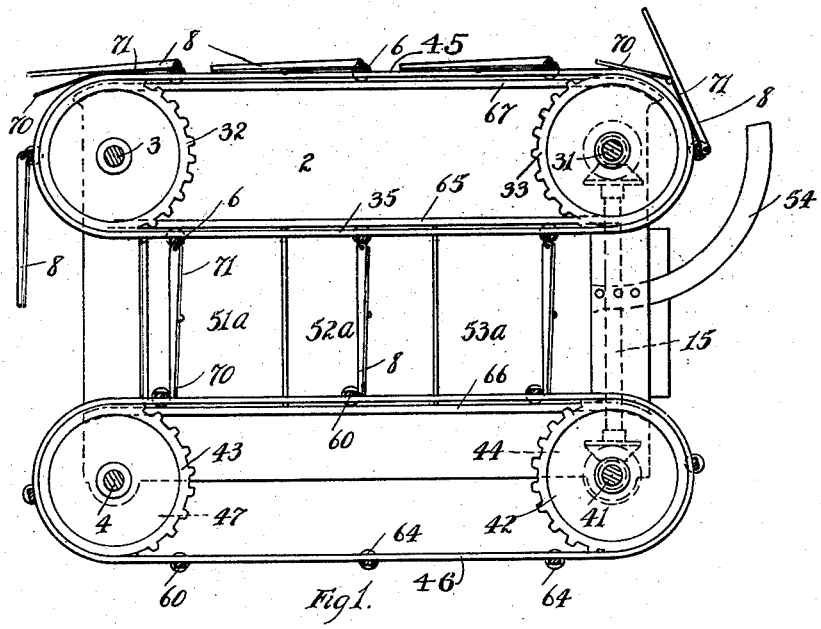
Figure 5:
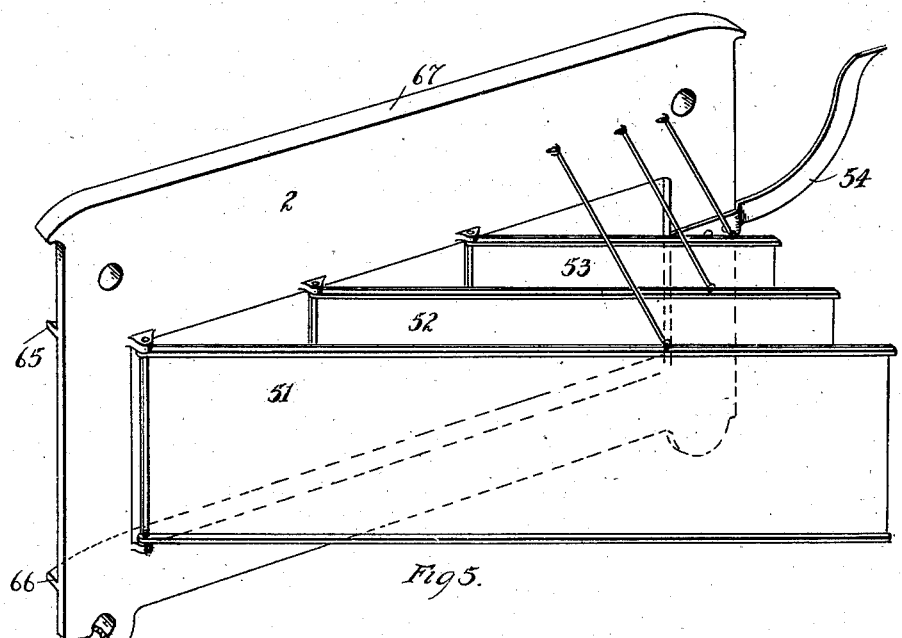
Figure 2:
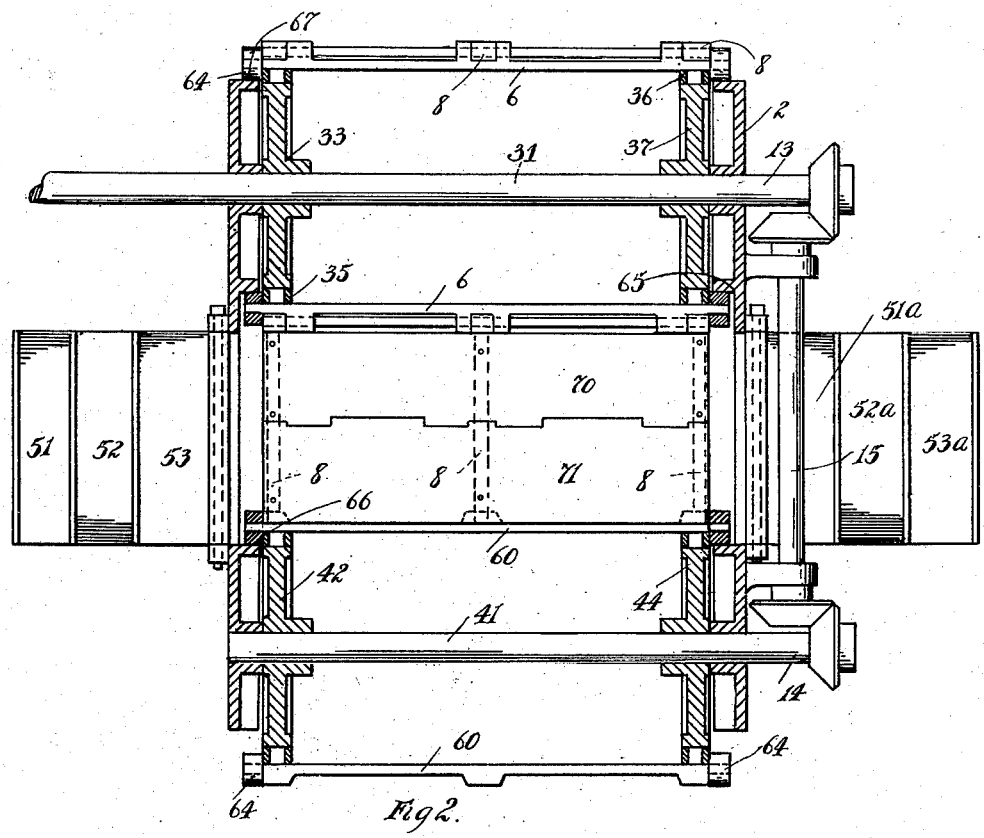
Figure 3:
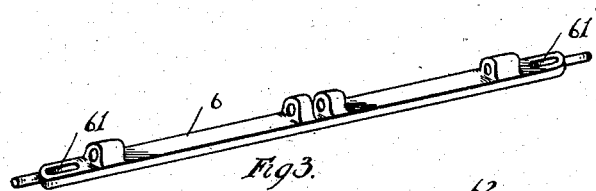
Figure 4:
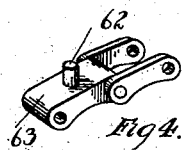

In the drawings, Figure 1 is a section of the motor. Fig. 2 is a vertical cross-section through the axis of the shafts 31 and 41. Fig. 3 is a perspective of a cross-bar. Fig. 4 is a perspective of the link of a sprocket-chain. Fig. 5 is a perspective of one of the sides, showing the coffer-wings.

The frame (indicated at 2) supports shafts 3 and 31, which are on a substantially horizontal plane in the upper part of the frame, and shafts 4 and 41 on a horizontal plane on the lower part of the frame. On shaft 3 are sprocket-wheels 32 and its companion wheel, (not seen in the drawings,) and on shaft 31 are sprocket-wheels 33 and 37. Sprocket-wheels 32 and 33 are connected by a sprocket-chain 35, and wheels 34 and 37 are connected by a sprocket-chain 36. The under set of shafts are also provided with sprocket-wheels. The sprocket-wheels on shaft 41 are indicated at 42 and 44, and the sprocket-wheel on shaft 4 is indicated at 43, and there is a companion sprocket-wheel, (not shown,) and these sprocket-wheels are belted by sprocket-chains 45 and 46. The sprocket-chains which belt the wheels 32 and 33 are connected by cross-bars 6, one of which is shown in detail in Fig. 3, to the sprocket-chain which belts wheels 34 and 37. The cross-bars 6 are provided at each end with an oval hole 61, that engages on a pin 62 of a link 63 of the sprocket-chain. The bars 6 carry wheels 64, that run on tracks 65 66 67. The holes are made oval to compensate for any want of adjustment or irregularity of motion in the wheels over which the chains run. Each cross-bar is provided with hinge-knuckles, and to the cross-bar is hinged a bucket-blade which is itself compound, being made of two pieces 70 and 71 hinged together. This compound blade bends or folds when rising around the wheel without offering the resistance which a wide non-folding bucket would offer, because of the long leverage which its outer parts would have. On the same bar 6 are hinged brace-arms 8, that are arranged to engage behind the buckets and prevent them from doubling outward.

On the lower set of wheels on shafts 4 and 41 are sprocket-chains connected by cross-bars 60, similar to the cross-bars 6. The cross-bars 60 rise on the upper side of the belting into the path of the hanging ends of the arms 8, which hang below the lower side of the upper system of sprocket-chains. The shafts 31 and 41 are provided on their projecting ends 13 and 14 with miter-gears, which mesh with miter-gears on the ends of a vertical shaft 15, and the two chains are arranged to travel with equal periphery speed.

The hanging buckets reach between the under side of the upper system and the upper side of the under system and are subjected to pressure of flowing water and are caused to travel because of such pressure. Each bucket folds down upon the chains during the period of its upstream travel and drops during the period of its downstream travel, and its lower edge engages the bars connecting the sprocket-chains of the lower system. When the buckets drop into the water, the outer edge of the bucket first strikes a cushioning-spring 54, that is curved somewhat eccentric to the curve in which the outer edges of the bucket would normally travel. The spring is spiral, and as the bucket drops its edge travels off from the spring and drops into the water easily.

The motor is provided with coffer-wings 51, 52, and 53, (51$^a$ 52$^a$ 53$^a$ on the opposite side,) which extend obliquely outward and upstream on either side of the motor and are arranged to direct a larger flow of water into the bucket-chamber than that which comes directly down along the stream. It also serves to protect the bucket from the dead water behind the paddle that is in front of it. Were the side wings omitted, each bucket as it enters the water would protect the bucket in front of it from any pressure except that which acts through the protecting-bucket, and consequently there would be no advantage derived from increasing the number of buckets; but the side wings carry into the bucket-chamber water that would otherwise pass down along the side of the motor without producing results, and they thus concentrate on the buckets a force greater than that due to the water, which would otherwise flow through the chamber and subject each bucket to an independent force no matter how many buckets may be in action.

What I claim is—

1. In a hydraulic motor, the combination of a frame provided with carrying-wheels arranged to carry sprocket-chains, a series of buckets carried by said sprocket-chains, an opposed system of a series of sprocket-chains, and means on said opposed system for engaging the outer ends of the buckets and supporting the same, substantially as described.

2. In a hydraulic motor, a casing provided with belting in two series arranged to run in opposite directions, buckets on one of said series arranged to engage with locks on the opposite series, and means for producing equal periphery speeds of the two series of belting, substantially as described.

3. In a hydraulic motor, in combination with two series of belts arranged to be driven in opposite directions, buckets arranged to cross the space between the belts, means for supporting the free ends of said buckets, and coffer-wings arranged to direct the water against said buckets, substantially as described.

In testimony whereof I sign this specification in the presence of two witnesses.

DAVID McINTYRE.

Witnesses:
CHARLES F. BURTON,
MAY E. KOTT.